United States Patent [19]

Stepanek, Jr.

[11] 3,946,902

[45] Mar. 30, 1976

[54] AUTOMATIC FEEDER FOR INFUSION OF A SOLUBLE SOLID SOLUTE INTO A CIRCULATING SOLVENT

[75] Inventor: Frank N. Stepanek, Jr., Syracuse, N.Y.

[73] Assignee: Aspen Industries, Inc., Tully, N.Y.

[22] Filed: Sept. 12, 1972

[21] Appl. No.: 288,253

Related U.S. Application Data

[63] Continuation of Ser. No. 868,374, Oct. 22, 1969, abandoned.

[52] U.S. Cl................................ 222/64; 23/267 A
[51] Int. Cl............................................ B67d 5/08
[58] Field of Search....... 222/64, 67, 57; 137/268 E; 23/267 A, 267 E

[56] References Cited
UNITED STATES PATENTS

| | | | |
|---|---|---|---|
| 3,107,156 | 10/1963 | Fredericks | 23/267 A |
| 3,112,046 | 11/1963 | Szekely | 221/306 X |
| 3,507,624 | 4/1970 | Schneider, Jr. et al. | 137/268 E |
| 3,578,776 | 5/1971 | Schneider, Jr. et al. | 23/267 E |
| 3,598,536 | 8/1971 | Christensen | 23/267 E |

*Primary Examiner*—Stanley H. Tollberg
*Attorney, Agent, or Firm*—Bain, Gilfillan & Rhodes

[57] ABSTRACT

An automatic feeder for infusing solid solutes into liquid solvents at an adjustable, predetermined, controlled rate to maintain an adjustable, predetermined, controlled concentration of solute in a solvent reservoir, the feeder including means for adjustably controlling the rate of infusion of solute into a circulating, solvent stream within a chamber by controlling the quantity of solvent in the chamber as well as surface area of solute immersed in the solvent, means for feeding solute into the solvent in the chamber in a programmed fashion over a relatively long period of time without attendance, means for preventing accidental syphoning of all of the solvent from the feeder, and means for automatically breaking contact between the solute and the solvent in the feeder during periods of dissolution; the feeder comprising a housing having solvent inlet and outlet ports, a float valve for adjustably controlling the level of solvent circulating in the housing; and an anti-syphoning device on the float valve to prevent total discharge of solvent from the feeder and a solid, solute supply canister mounted on the housing extending into the solvent therein, the canister having a narrowed neck at the bottom to release tablets of solid solute after a predetermined degree of dissolution.

26 Claims, 6 Drawing Figures

AUTOMATIC FEEDER FOR INFUSION OF A SOLUBLE SOLID SOLUTE INTO A CIRCULATING SOLVENT

This application is a continuation of application Ser. No. 868,374 filed Oct. 22, 1969, now abandoned.

BACKGROUND OF INVENTION

There are many uses for feeders which automatically infuse solid solutes into liquid solvents, as for instance in the addition of chlorine bearing compounds and other chemical additives to swimming pools, the addition of anti-pollution agents to potable or other surface water supplies, the infusion of solid, soluble chemicals into various circulating liquids to enrich the same in industrial chemical processes and in the addition of consumable anti-corrosion additives in air conditioning systems.

In each such instance, the rate of addition of the solute and its concentration must be carefully controlled within relatively narrow limits. However, under many conditions, the range of feed rates and concentrations must be adjustably controlled within extremely wide ranges, although the particular feed rate and concentration at any one time must be maintained within narrow limits. For instance, in swimming pools, the concentration of chlorine must be controlled within relatively narrow predetermined limits. However, the rate of infusion of chlorine bearing compounds is dependent upon many factors including but not limited to ambient temperature and the extent of use of the pool which tends to destroy or consume chlorine. Moreover, under given conditions, some swimming pools require a "shock" treatment of chlorine or other additives, wherein the rate of addition and the concentration of the additive far exceeds the rate and concentration maintained under normal operating conditions. Thus, a feeder supplying a solid, soluble chlorine compound and other additives to a swimming pool must be sufficiently adjustable to accommodate for widely varying demands in the range of both the rate of supply and concentration of chlorine yet maintained at any one time, the rate of supply and concentration within relatively narrow limits.

Another vital consideration for such feeders is the frequency with which the feeder must be attended to replenish the supply of solute or to alter the program for both the rate of addition of solute and the identity of the solute added. Obviously, it is desirable to increase the time between attendance for either replenishing the supply of solute or altering the program of addition consistent with the size of the feeder and the cost of the same. Thus, it is an object of the present invention to provide means to store sufficient solute for relatively long term operation and to infuse small quantities thereof under precisely controlled conditions. In addition, the said means are adapted to automatically alter the program of addition, varying not only the rate of delivery and hence, concentration, but also the identity of the solute added over relatively long periods of time without manual attendance.

The feeder described and claimed herein employs tablets of solid solute which have a predetermined, relatively precisely controlled rate of dissolution in the solvent under given conditions of concentration and temperature. The rate of dissolution of such tablets may be altered by well known techniques in the manufacture of the tablets.

The feeder includes a housing containing a predetermined, controlled quantity of solvent with means for circulating solvent through the housing at a controlled predetermined rate. A tablet feeding canister containing a relatively long-term supply of tablets is mounted in the housing with one or more tablets exposed to the solvent in the housing. The level of solvent is maintained within narrow limits by means of a float valve. The concentration of solute in the solvent is a function of its solubility in the solvent. The rate of supply of solute to the solvent in the reservoir supplying the feeder is a function of the rate of dissolution of the solute tablet which in turn is a function of, the surface area of solute tablet exposed to the solvent in the feeder the solubility of the tablet itself, the concentration of the solute in the solvent and, to a limited degree, the rate of circulation of solvent through the feeder as it affects the concentration of solute in the solvent. The parameter most easily controlled is the surface area of the solute tablet exposed to the solvent in the feeder which, in the invention described and claimed herein, is a function of the solvent level in the housing of the feeder. In addition, the rate of supply of solute may also be controlled to a large extent by the basic rate of dissolution of the solute tablet as determined by its constituents and manner of manufacture.

The quantity of level of solvent in the feeder, the surface area of solute exposed to the solvent, the rate of circulation of solvent through the feeder and the rate of dissolution of the tablet can be balanced such that the concentration of the solute in the solvent reservoir may be maintained within narrow limits. However, means are also provided for either manually or automatically changing various parameters to change the rate of delivery of the solute to the solvent reservoir. Moreover, means are provided to prevent the undesired syphoning of all of the solvent from the feeder housing, which can create difficulties of priming the pump supplying solvent to the feeder. Nevertheless, if circulation of solvent in the feeder is terminated, means are provided for breaking contact between the solid solute and the solvent. This is particularly important under conditions, such as those commonly found in swimming pool applications, where the interaction of the solute with the solvent under stagnant conditions over a long period of time can result in the formation of an undesirable and potentially dangerous gas.

SUMMARY OF INVENTION

An automatic feeder for infusion of a soluble solid solute into a circulating solvent comprising a housing, solvent inlet and outlet means in the housing, valve means for controlling the level of solvent in the housing, a hollow, solid solute supply canister having an open bottom, the open bottom being normally located within the housing intermediate its top and bottom and submersible in the solvent in the housing, and internal constriction means in the canister in proximity to the open bottom thereof.

PREFERRED EMBODIMENT OF INVENTION

The objects and advantages aforesaid as well as other objects and advantages may be achieved by the automatic feeder claimed herein, a preferred embodiment of which is illustrated in the drawings in which:

Figure 1:
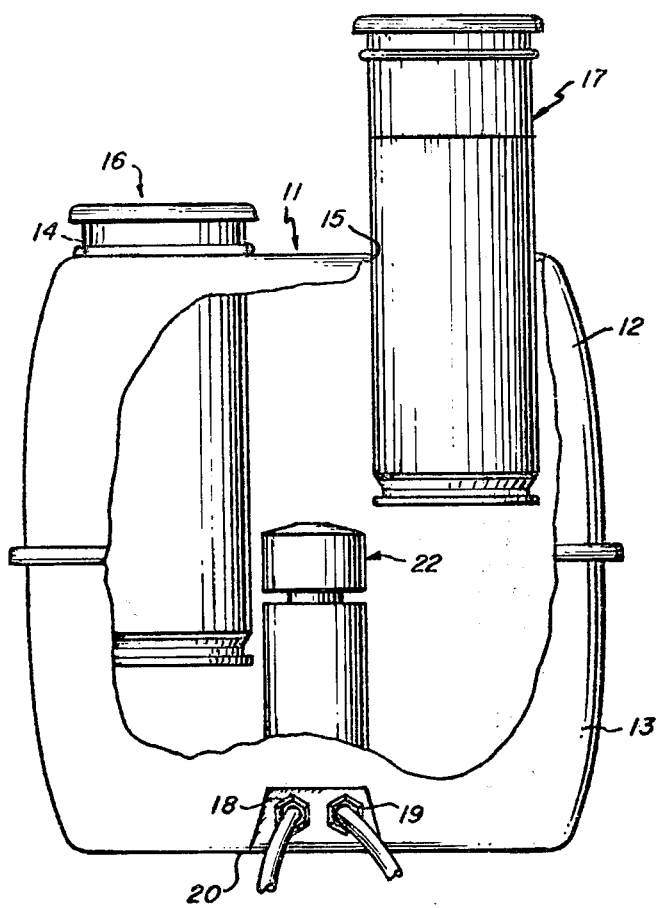
FIG. 1 is a side elevational, partially broken away view of the feeder with two supply canisters mounted thereon at different levels.
Figure 2:
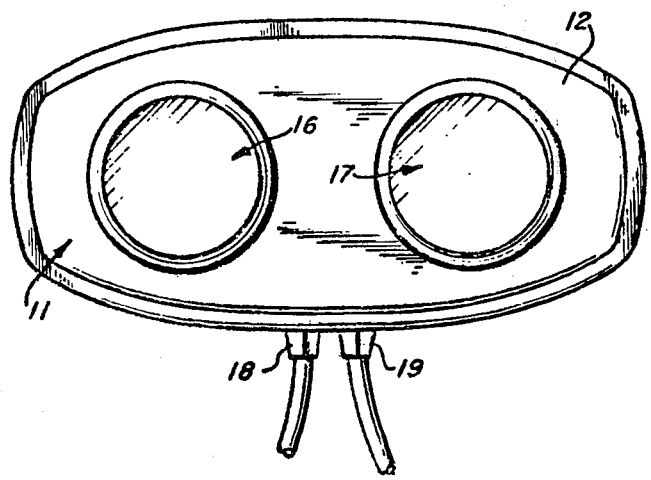
FIG. 2 is a top plan view of the feeder illustrated in FIG. 1 with one of the supply canisters removed.
Figure 3:
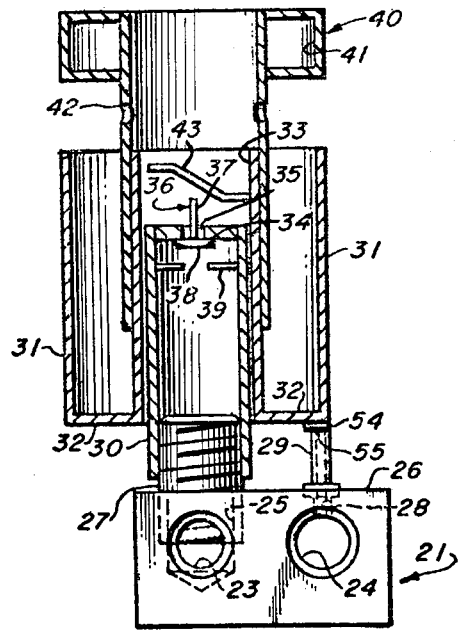
FIG. 3 is a side elevational, cross-sectional view of a float operated solvent inlet and outlet valve and valve block.
Figure 4:
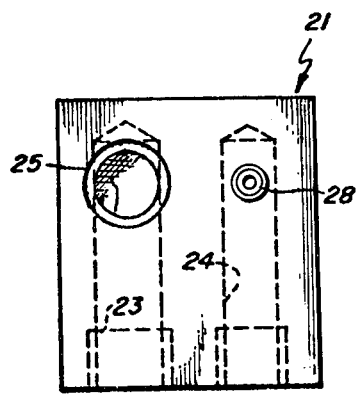
FIG. 4 is a top plan view of the valve block illustrated in FIG. 3.
Figure 5:
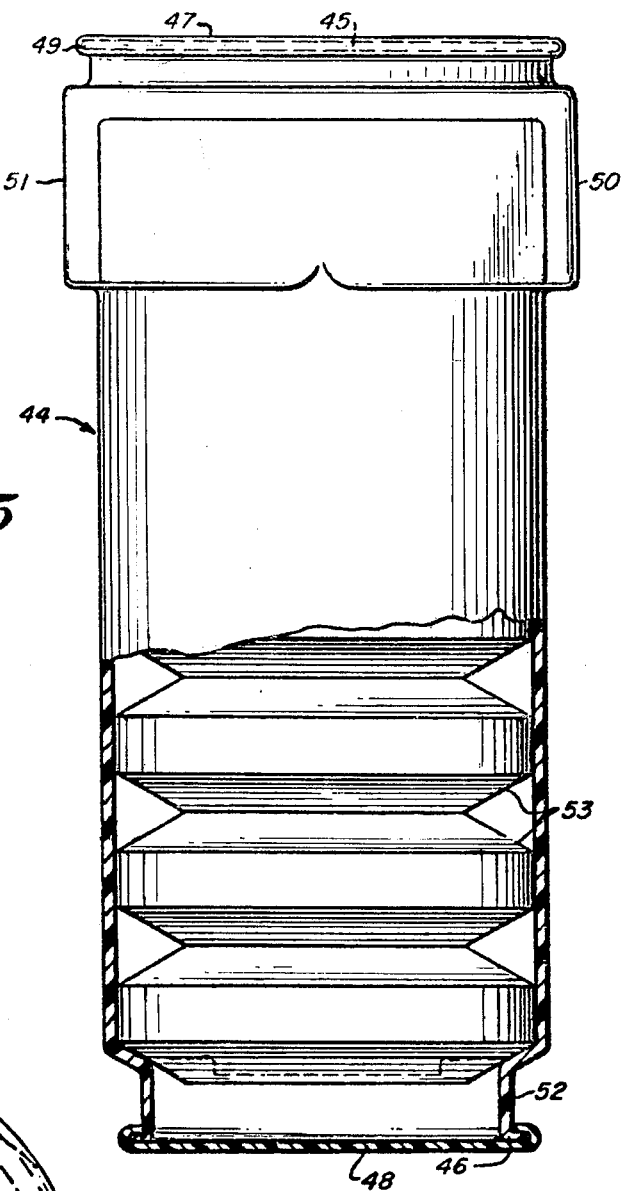
FIG. 5 is a side elevational, cross-sectional view of a supply canister.
Figure 6:
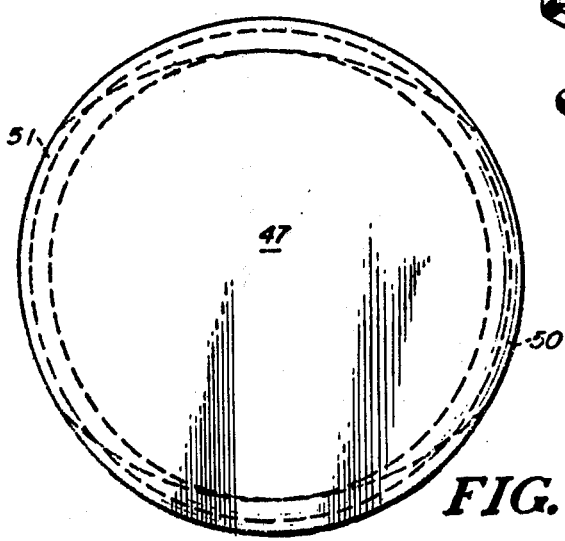
FIG. 6 is a top plan view of the supply canister illustrated in FIG. 5.

Referring now to the drawings in detail, the automatic feeder comprises a housing 11, which may be conveniently fabricated of a pair of plastic sheets 12, 13 joined at their open ends. A top shell 13 of the housing 11 is provided with a pair of generally elliptical openings 14, 15 adapted to slidably receive supply canisters 16, 17 to be described in greater detail herein. The particular shape of the housing 11 is not critical to invention. The material from which the housing 11 is fabricated should be compatible with the solute and solvents to be used therewith. Obviously, the housing must be relatively free from attack by either the solute or solvent or at least the internal surfaces of the housing in contact with the solute and solvents must be protected against corrosion or undesired reaction.

The housing 11 is provided with a circulating solvent inlet port 18 and outlet port 19 in close proximity to the bottom 20. The inlet port 18 and outlet port 19 are connected to a bored valve block 21. The valve block 21 supports an adjustable float valve 22 which controls the level of solvents in the housing 11.

The valve block 21 is provided with a horizontal inlet bore 23 and a generally parallel horizontal outlet bore 24. The inlet bore 23 connects to a threaded, vertical inlet bore 25, which communicates with the top 26 of the block 21. A threaded nipple 27 is engaged to the threaded bore 25 and extends above the top 26 of the block 21.

A vertical outlet bore 28 connects to the horizontal outlet bore 24 and communicates with the top 26 of the block 21. A vertical outlet tube 29 connects to the bore 28 and extends upwardly from the top 26 of the block 21.

A float operated valve 22 is slidably mounted on a generally vertical inlet stand pipe 30 threadably engaged to the nipple 27. The float valve 22 comprises an outer, open-topped annular shell 31 having a bottom 32. An open-bottomed, central conduit 33 is mounted in the bottom 32 of the shell 31 and is adapted to slidably telescopically mount on the stand pipe 30. The top of the conduit 33 is open.

The top of the stand pipe 30 is provided with a valve seat 34 with a passage 35. A toggle valve 36 is operatively mounted in the top of the standpipe 30. The toggle valve 36 comprises a stem 37 with a disc 38 on its bottom. The stem 37 extends upwardly through the passage 35. Pressure from water entering the inlet port 18 and passing upwardly through the stand pipe 30 forces the disc 38 of the valve 36 against the valve seat 34, sealing the passage 35. A limit flange 39 prevents the disc 38 from descending past a predetermined level in the stand pipe 30 in the absence of water pressure.

An adjustable, floating level control 40 is engaged to the conduit 33. The said control 40 comprises an annular, closed float chamber 41 mounted on the top of a vertically depending, elongated sleeve 42. The sleeve 42 is frictionally and telescopically mounted on the conduit 33 of the bottom shell 31. The level of the sleeve 42 on the conduit 33 may be manually adjusted against their frictional interengagement.

An upset cam 43 inside of the conduit 33 is engagable with the top of the valve stem 37. When the upset cam 43 moves downwardly to engage the valve stem 37, the stem 37 is tipped to one side thereby angularly upsetting the disc 38 opening the passage 39 in the valve seat 34. Water is then free to pass from the stand pipe 30 upwardly through the sleeve 42 and into the housing 11.

In operation, when the level of fluid in the housing 11 is below that set by the float valve 32, the upset cam 43 engages the stem 37 opening the passage 35 to the flow of water. Water flows upwardly through the open top 44 of the sleeve 42 and into the housing 11. As the fluid level in the housing rises, the float chamber 41 floats upwardly drawing the upset cam 43 inside of the conduit 33 upwardly away from the valve stem 37. Water pressure then forces the disc 38 against the valve seat 34, closing the passage 35. Thus, the level of fluid in the housing 11 may be controlled to a precisely predetermined level which may be manually adjusted.

The solid, solute supply canisters 16, 17 are identical and each comprise a hollow generally cylindrical body 44 having an open top 45 and an open bottom 46, each adapted to receive snap-on covers, respectively 47 and 48. While the canisters 16, 17 are shown and described as comprising generally cylindrical bodies 44, the cross-sectional configuration of the internal passage in the body 44 should merely be adapted to pass tablets of solid solute downwardly therethrough preferably under the influence of gravity.

The body 44 is provided with a radially enlarged flange 49 beneath the open top 45. Immediately beneath the flange 45 are a pair of diametrically opposed enlargements 50, 51 which extend downwardly for approximately one-quarter of the axial length of the body 44. The body 44 is provided with a radially reduced neck 52 adjacent to the open body 46.

In operation, solid solute tablets 53 are stacked in the hollow body 44 from top to bottom. The top and bottom covers 47, 48 are applied during shipment of the canisters 16, 17. In use, the bottom cover 48 is removed, and the body 44 inserted bottom first downwardly through one of the openings 14 or 15 in the top of the housing 11. The openings 14 and 15 are shaped and dimensioned to pass through the radial enlargements 50, 51 if the body 44 is properly oriented. However, when rotated out of registration with the openings 14, 15, the enlargements 50, 51 on the body 44 will engage the top of the housing 11 peripheral to the openings 14, 15. Thus, the level of the open bottom 46 of the body 44 of the supply canisters 16 or 17 may be positioned at two different levels with respect to the fluid in the housing 11.

The axial length of the radial enlargements 50, 51 on the body 44 of the canisters are usually longer than the thickness of one tablet 53 of solute seated therein. If the level of solvent in the housing 11 is adjusted by means of the float valve 22 to immerse one tablet 53 of solute when the bottom 46 of the canisters 16, 17 are at their higher level, two or more tablets will be immersed when the canisters are rotated to pass through the openings 14, 15 to descend to the lowermost position. In addition, the level of solvent in the housing 11 may be adjustably controlled by means of sliding sleeve 42 of the float valve 22 upwardly or downwardly on the conduit 33 of the bottom shell 31. Thus, there is further control of the number of tablets 53 which will be immersed in solvent in the housing 11 at any one time. Of course, the number of canisters 16, 17 and the level of the bottom 46 of each may also be adjusted with respect to the level of solvent in the housing 11 to further increase the range of the number of tablets 53 which can be immersed in the solvent at any one time. The rate of supply of solute to the solvents circulating in the housing 11 is at least in part a function of the area of tablets 53 immersed in the solvent at any one time. Hence, the rate of delivery of solute to the circulating solvent may be precisely and adjustably controlled within a wide range.

When each tablet 53 at the bottom of canister 16 or 17 in contact with solvent melts or dissolves to a diameter less than the diameter of the neck 52, it drops into the solvent in the housing 11. All other tablets 53 gravitionally index downwardly thereby immersing fresh tablets 53 in the solvent.

It must be borne in mind that the solvent containing relatively large concentrations of solute has a density greater than solvent containing lesser concentrations of solute. Hence, although the tablet 53 in the bottom 46 of the canister 16 or 17 is relatively confined, the immediate ambient concentration does not tend to rise to such levels as to decrease the rate of dissolution because of the normal convection between solvent containing higher quantities of solute falling from the bottom of the canister 16 or 17 and fresh and less concentrated solvent rising to replace it.

The float valve 22 also contains means to prevent the accidental or unintentional discharge of all solvent from the housing 11. The bottom 32 of the shell 31 of float valve 22 is provided with a sealing gasket 54 which is positioned vertically above the top 55 of the vertical outlet tube 29 mounted in valve block 21. If the pump supplying solvent to the housing 11 is shut off, solvent tends to flow out through the vertical outlet tube 29 and outlet port 19 under the influence of gravity and syphoning phenomena. As the level of solvent in the housing 11 decreases, the float valve 22 slides downwardly on the stand pipe 30 until the gasket 54 on the bottom 32 of the shell 31 engages the top 55 of the vertical outlet tube 29, sealing it against further discharge of solvents. Thus, the pump supplying the housing 11 will never be deprived of priming fluid.

While it is important not to discharge all solvent from the housing 11 during shut down of solvent supply or circulation, it is equally as important in many instances to withdraw the tablets 53 of solute from the solvent. For instance, in the swimming pool arts, if certain chlorine bearing tablets are left in stagnant water, the chlorine reacts with nitrogen in the water to generate a gas which is principally nitrogen trichloride. The generation of this gas is undesirable and frequently dangerous, particularly in closed systems.

In the present feeder, the sealing gasket 54 on the bottom 32 of the lower shell 31 of float valve 22 will not engage the top 55 of the vertical outlet tube 29 until the level of solvent in the housing 11 is beneath the lowermost extension of the bottom 46 of the canisters 16, 17. Hence, the solute tablets 53 will never lie in stagnant solvents in the housing 11.

The program of addition of solute may be controlled by the sequence of solute tablets 53 in the canisters 16, 17. Since the rate of dissolution of tablets 53 may be predetermined, tablets of different character may be periodically inserted in the column of tablets in the canisters. Thus, periodically, different solutes will be supplied to the solvent.

Moreover, solute of the same character may be supplied periodically in a tablet which dissolves much more rapidaly to periodically produce sudden increases in concentration of solute in the solvent. With the use of two canisters 16 and 17 and their ability to be positioned at different levels, a versatile program of solute addition may be effected. If there is an unexpected sudden demand for greater concentrations or lesser concentrations of solutes, the float valve 22 may be manually adjusted in connection with the number and level of canisters in order to manually produce sudden changes in solute concentration.

While the feeder is provided with means for preventing tablets 53 from lying in stagnant solvent for long periods of time, the housing 11 is nevertheless not sealed against the escape of gas because of the loose fit between the canisters 16, 17 and the elliptical openings 14, 15. Hence, any gas which tends to accumulate in the housing 11 will circulate outwardly through the openings 14, 15 and fresh air will seep in, thereby preventing dangerous over-concentrations.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

I claim:

1. An automatic feeder comprising
   a. a housing,
   b. solvent inlet and outlet means in the housing,
   c. valve means operatively connected to at least the said inlet means responsive to the level of solvent in the housing, said valve means maintaining a substantially constant solvent level in the housing under normal operating conditions,
   d. a hollow, solid solute supply canister detachably suspended from the top of the housing and depending therefrom, the canister having an open bottom submersible in the solvent in the housing under normal operating conditions,
   e. a plurality of solid solute tablets vertically stacked in the canister, and
   f. internal constriction means in the canister in proximity to the open bottom thereof, the said constriction means being shaped and dimensioned to engage and retain the lowermost tablet within the canister until the said lowermost tablet has dissolved sufficiently to pass through said constriction means.

2. An automatic feeder comprising,
   a. the structure in accordance with claim 1, in which
   b. the said valve means include means for adjustably controlling the aforesaid solvent level in the housing.

3. An automatic feeder comprising,
   a. the structure in accordance with claim 1, and
   b. means responsive to the solvent level for preventing air from entering the solvent outlet in the housing notwithstanding termination of solvent flow through the said inlet.

4. An automatic feeder comprising,
   a. the structure in accordance with claim 2, and b. means for preventing air from entering the solvent outlet in the housing notwithstanding termination of solvent flow through the said inlet.

5. An automatic feeder comprising:
a. the structure in accordance with claim 1, and
b. cooperatively engagable means on the top of the housing and at spaced-apart levels on the canister intermediate its top and bottom to support the bottom of the canister at a plurality of levels with respect to the solvent level in the housing.

6. An automatic feeder comprising,
a. the structure in accordance with claim 1 and
b. means for lowering the solvent level in the housing beneath the lowermost level of solute in the supply canister, and
c. means for preventing air from entering the solvent outlet in the housing notwithstanding termination of solvent flow through the said inlet.

7. An automatic feeder comprising,
a. the structure in accordance with claim 6, in which
b. the said means for preventing air from entering the solvent outlet include a discharge conduit in the housing,
c. float means in the housing movable in response changes in the solvent level in the housing,
d. closure means operatively connected to the float means engagable and disengagable with the discharge conduit, the said closure means preventing discharge of solvent when the solvent in the housing has reached a predetermined level.

8. An automatic feeder comprising:
a. the structure in accordance with claim 1 in which,
b. the valve means are an upstanding inlet conduit in the housing,
c. a valve in the top of the inlet conduit,
d. a float,
e. a float conduit depending from the float and slidably mounted on the inlet conduit,
f. means in the float conduit operatively engagable with the valve upon vertical movement of the float,
g. a generally upstanding solvent discharge conduit in the housing,
h. submersible means connected to the float, the submersible means being engagable and disengagable with the top of the solvent discharge conduit upon vertical movement of the float to prevent discharge of solvent from the housing when engaged to the outlet conduit.

9. An automatic feeder comprising:
a. the structure in accordance with claim 8 in which,
b. the said submersible means close the solvent discharge conduit only after the level of solvent in the housing is beneath the lowermost level of solute in the housing.

10. An automatic feeder comprising,
a. the structure in accordance with claim 5, in which
b. said cooperatively engagable means include an opening in the top of the housing shaped and dimensioned to freely receive the canister to at least the level of lowermost of said cooperatively engagable means on the canister,
c. said cooperatively engagable means being engagable and disengagable upon rotation of the canister with respect to the opening in the top of the housing, the canister being freely movable through said opening intermediate the said means on the canister.

11. An automatic feeder comprising,
a. the structure in accordance with claim 10, in which
b. the canister includes an elongated hollow body open at the bottom and internally shaped and dimensioned to receive and support a plurality of vertically stacked solid solute tablets, and, in which
c. the said cooperatively engagable means on the canister include at least two external radial enlargements on the side of the canister, one above the other, and in which
d. the said cooperatively engagable means on the housing include at least one radial enlargement in the said opening in the top of the housing through which at least the lowermost of said radially enlargements on the canister will pass when in vertical registration, at least the uppermost of said enlargement on the canister being engagable with said opening in the top of the housing.

12. An automatic feeder comprising,
a. the structure in accordance with claim 10 in which
b. the opening in the top of the housing is shaped and dimensioned relative to the canister to permit the escape of gas from within the housing when the canister is mounted in said opening.

13. An automatic feeder comprising,
a. a structure in accordance with claim 11, in which
b. said cooperatively engageable means include an opening in the top of the housing shaped and dimensioned to freely receive the canister to at least the level of the lowermost of said cooperatively engageable means on the canister,
c. said cooperatively engageable means on the canister including (a) at least one lowermost radial offset on the side of the said body of the canister intermediate to its top and bottom, the lowermost radial offset being passable through the opening in the top of the housing only when in vertical registration with the radial enlargement in the opening on the top of the housing, and
d. an uppermost radial enlargement on the side of the said body positioned at a greater distance from the bottom thereof than the lowermost offset, the uppermost radial enlargement being shaped and dimensioned not to pass through the said opening in the top of the housing at least when the said uppermost radial enlargement is not in vertical registration with the radial enlargement in said opening.

14. An automatic feeder comprising:
a. the structure in accordance with claim 13 and
b. a generally upstanding solvent discharge conduit in the housing,
c. float means in the housing vertically movable in response to changes in the solvent level in the housing,
d. a bottom in the float means engagable and disengagable with the top of the solvent discharge conduit, said float means preventing discharge of solvent when the said bottom is engaged to the discharge conduit.

15. In an automatic feeder including a housing, means for circulating solvent through the housing, solid solute supply means operatively connected to the housing, and a valve for adjustably controlling the solvent level in the housing comprising:
a. an upstanding inlet conduit in the housing,
b. a valve in the top of the inlet conduit,
c. a float,
d. a float conduit depending from the float and slidably mounted on the inlet conduit, e. means in the float conduit operatively engageable with the said valve upon vertical movement of the float, f. a generally upstanding solvent discharge conduit in the housing, g. submersible means connected to the float, the submersible means being engageable and disengageable with the top of the solvent discharge conduit upon vertical movement of the float, the submersible means preventing discharge of solvent when engaged to the solvent discharge conduit.

16. A solid solute supply canister comprising a. a hollow body open at the bottom and shaped and dimensioned to receive and suggest a plurality of vertically stacked solid solute tablets, b. a plurality of solid solute tablets within the body disposed substantially in a row from the top to the bottom thereof, c. internal, generally radially non-elastically expandable constriction means in the body in proximity to the bottom end thereof, the minimum internal diameter of the body at the constriction means being less than the maximum diameter of at least one of said tablets, d. a plurality of radial enlargements on the external surface of the body generally proximal to the top thereof, e. the said constriction means being substantially non-radially elastically expandable and being dimensioned to permit the gravitationally downward discharge of the said tablets each as substantially a unitary member when said tablets are sufficiently small as compared to the constriction means.

17. A solid solute supply canister comprising, a. the structure in accordance with claim 16, in which, b. at least one of the said radial enlargements consisting of a radial offset on at least one side of the body.

18. An automatic feeder comprising, a. the structure in accordance with claim 13, in which b. the said uppermost radial enlargement on the body of the canister will not pass through the opening in the top of the housing irrespective of the annular orientation thereof with respect to the radial enlargement in said opening.

19. An automatic feeder comprising, a. the structure in accordance with claim 1, in which b. the canister includes an elongated body open at the bottom and internally shaped and dimensioned to receive and support a plurality of vertically stacked solid solute tablets, c. an external radially enlarged offset on at least one side of the said body, d. a step between the bottom of the said offset and the body of the canister, e. a generally circular external radial enlargement on the body above the said offset, f. the opening in the top of the housing shaped and dimensioned to pass through the canister at the said offset, g. the outside diameter of the said circular enlargement being sufficiently greater than the minimum diameter of the opening in the top of the housing not to pass therethrough.

20. An automatic feeder comprising, a. the structure in accordance with claim 19, in which b. the said offset extending upwardly to the proximity of the circular enlargement.

21. In a feeder for automatically disolving and infusing a solid solute into a solvent including a feeder housing, solvent inlet and outlet means in the housing and valve means responsive to the solvent level in the housing for adjustably determining and maintaining a desired, substantially constant solvent level in the housing, a solid solute supply canister detachably mountable to the top of the housing and depending into the housing to adjustably predetermined varying depths, the said canister comprising, a. an elongated hollow body open at the bottom and internally shaped and dimensioned to receive and support a plurality of vertical stacked solid solute tablets, b. a plurality of vertically stacked solid solute tablets in the housing, c. internal constriction means in the canister in proximity to the open bottom thereof, the internal diameter at the constriction means being less than the diameter of at least one of said tablets, the said constriction means being shaped and dimensioned to engage and retain such tablet within the hollow body against gravitational discharge until the said tablet has dissolved sufficiently to pass through said constriction, d. the internal surface of the body being sufficiently smooth to permit the gravitationally induced downward indexing of tablets therein as the lowermost tablet is discharged through the said open bottom, e. a plurality of external radial enlargements on the side of the body, generally proximal the top end thereof.

22. In a feeder for automatically dissolving and infusing a solid solute into a solvent including a feeder housing, solvent inlet and outlet means in the housing and valve means to respond to the solvent level in the housing for adjustably determining and maintaining a desired, substantially constant solvent level in the housing, a solid solute supply canister detachably mounted to the top of the housing and depending into the housing to adjustably determine varying depths, the said canister comprising, a. the structure in accordance with claim 21 in which b. at least one external radial offset on the side of the canister intermediate its top and bottom, and c. an external radial enlargement on the canister more proximal its top end than the said offset, the maximum diameter of the said radial enlargement being greater than the minimum diameter of the combined canister and offset.

23. In a feeder for automatically disolving and infusing a solid solute into a solvent including a feeder housing, solvent inlet and outlet means in the housing and for adjustably determining and maintaining a desired, substantially constant solvent level in the housing, a solid solute supply canister detachably mountable to the top of the housing and depending into the housing to adjustably predetermined varying depths, the said canister comprising, a. the structure in accordance with claim 21, in which b. at least one of said radial enlargements on the external surface of the body being generally circular, and c. at least one pair of generally diametrically opposed radial enlargements on the external surface of the body more proximal to the bottom than said circular radial enlargement, the said pair of diametrically opposed radial enlargements being collectively non-circular in a plane generally perpendicular to the axis of the body between the top and bottom thereof; the minimum diameter of said pair of opposed radial enlargements being less than the diameter of the circular enlargement and the maximum diameter of said pair of opposed radial enlargements being greater than the diameter of the circular enlargement.

24. In a feeder for automatically dissolving and infusing a solid solute into a solvent including a feeder housing, solvent inlet and outlet means in the housing and valve means responsive to the solvent level in the housing for adjustable determining and maintaining a desired, substantially constant solvent level in the housing, a solid solute supply canister detachably mountable to the top of the housing and depending into the housing to adjustable predetermined varying depths comprising, a. the structure in accordance with claim 23, in which
b. the uppermost radial enlargement is a circular rib.

25. A solid solute supply canister comprising,
a. the structure in accordance with claim 16, and,
b. at least one external radial offset on the side of the canister intermediate its top and bottom, and
c. an external radial enlargement on the canister more proximal to its top and than the said offset, the maximum diameter of said radial enlargement being greater than the minimum diameter of the combined canister and offset.

26. A solid solute supply canister comprising,
a. the structure in accordance with claim 16, and
b. at least one of said radial enlargements on the external surface of the body being generally circular, and
c. at least one pair of generally diametrically opposed radial enlargements on the external surface of the body more proximal to the bottom than said circular radial enlargement, the said pair of diametrically opposed radial enlargements being collectively non-circular in a plane generally perpendicular to the axis of the body between the top and bottom thereof; the minimum diameter of said pair of opposed radial enlargements being less than the diameter of the circular enlargement and the maximum diameter of said pair of opposed radial enlargements being greater than the diameter of the circular enlargement.

* * * * *